Oct. 10, 1939.  A. WESTERMAYER  2,175,712

PIPE JOINT

Filed Sept. 4, 1937

Inventor
August Westermayer
by
Paul Fehrland
Attorney

Patented Oct. 10, 1939

2,175,712

UNITED STATES PATENT OFFICE 2,175,712

PIPE JOINT

August Westermayer, Oberesslingen, Germany, assignor to the firm J. Eberspächer, Esslingen on the Neckar, Germany Application September 4, 1937, Serial No. 162,551
In Germany October 28, 1936

1 Claim. (Cl. 285—92)

This invention relates to improvements in pipe joints.

It is well known in the art to shape the ends of pipes to balls and to connect the spherical ends by a socket having inner spherical surfaces so that a point flexible in all directions is formed. The socket in such devices either consists of two parts screwed together or it is, for instance, provided with hinges and can be opened after releasing the screws. In all constructions of this kind the joints show gaps of the inner spherical faces not covered by the socket at the points where the parts are screwed together or where the hinges are applied or generally where separating seams occur.

The object of my invention is to provide a flexible pipe joint comprising two pipes having their adjacent ends shaped in the form of balls, a sheet metal socket surrounding said ends and in the form of two spherical segments divided into two halves by a section along a line connecting the spherical centers, the side edges of each half being bent to spherical portions of a somewhat greater radius than the other part of the segments and having a pan-like lug at their outer surface, one of the two lugs of each half having a greater size than the other and receiving the smaller lug of the opposite half, a tongue on each of the said halves fastened thereto below one of the said widened portions, said tongues fitting and covering the spherical ends of the pipes and extending into the widened portions of the opposing halves.

In the annexed drawing the invention is illustrated by way of example.

Figure 1:
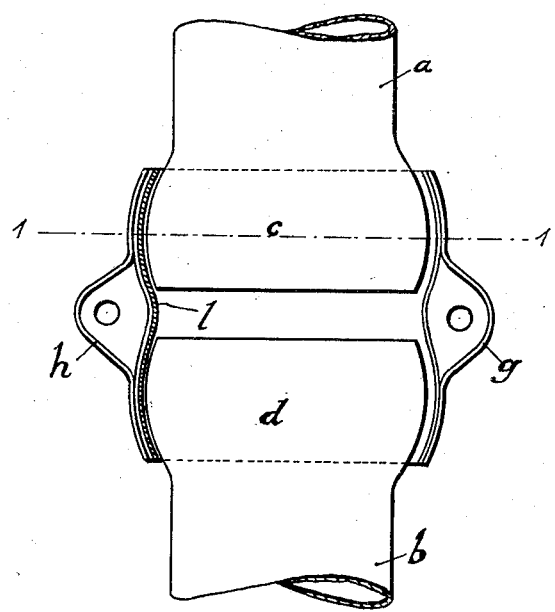
Fig. 1 is an elevation of a joint made according to the present invention, the front part of the shell being removed and the prolongation being shown in cross-section.
Figure 2:
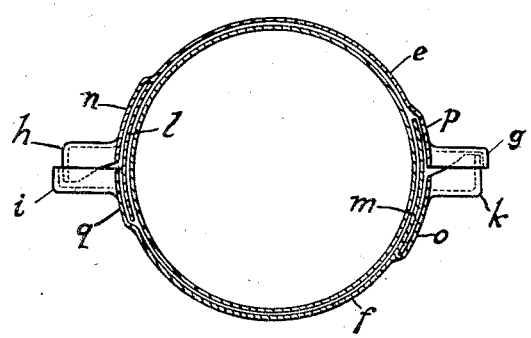
Fig. 2 is a cross-sectional view taken along the line I—I of Fig. 1.

The pipes $a$ and $b$ to be connected by a flexible joint are ending with spherical faces $c$ and $d$. Over these spherical faces a shell body composed of two parts is placed the halves $e$ and $f$ of which are provided with lugs $g$ and $h$ or $i$ and $k$ respectively by which the halves may be screwed together. The lugs $h$ and $i$, $g$ and $k$ are of different size and engage one another. The halves $e$ and $f$ of the shell carry prolongations $l$ and $m$ of a certain width likewise forming spherical surfaces and encompassing the adjacent spherical faces $c$ and $d$ at the end of the pipes.

These prolongations project beyond the joints between the two halves of the socket and farther cover a certain area of the other half of the socket. The halves $e$ and $f$ are provided, at the points where the prolongations $l$ and $m$ are arranged, with extensions $n$ and $o$ or $p$ and $q$ respectively communicating at the joints between the halves of the socket.

The gap which otherwise would be left free between the ends $c$ and $d$ of the pipes on the one hand and the halves $e$ and $f$ of the socket on the other hand is covered in the device just described by the prolongations $l$ and $m$. These prolongations at the same time enlarge the contacting surfaces of the ball-joint thereby warranting moreover a better tightness and a smaller pressure per unit of surface. The lugs $h$ and $i$ or $g$ and $k$ engaging into one another assist in stiffening the shell body surrounding the ends $c$ and $d$ of the pipes.

In similar manner the shell body $e$, $f$ may also be shaped to form more than two parts, the different parts being either screwed together, or besides connected by hinges, or united in any other well-known manner.

I claim:

A flexible pipe joint comprising two pipes having their adjacent ends shaped in the form of balls, a sheet metal socket surrounding said ends and in the form of two spherical segments divided into two halves by a section along a line connecting the spherical centers, the side edges of each half being bent to spherical portions of a somewhat greater radius than the other part of the segments and having a pan-like lug at their outer surface, one of the two lugs of each half having a greater size than the other and receiving the smaller lug of the opposite half, a tongue on each of the said halves fastened thereto below one of the said widened portions, said tongues fitting and covering the spherical ends of the pipes and extending into the widened portions of the opposing halves.

AUGUST WESTERMAYER.